United States Patent
Brookes

(10) Patent No.: US 11,409,609 B2
(45) Date of Patent: Aug. 9, 2022

(54) SINGLE EVENT EFFECT MITIGATION

(71) Applicant: ROLLS-ROYCE plc, London (GB)

(72) Inventor: David F Brookes, Derby (GB)

(73) Assignee: ROLLS-ROYCE PLC, London (GB)

( * ) Notice: Subject to any disclaimer, the term of this patent is extended or adjusted under 35 U.S.C. 154(b) by 428 days.

(21) Appl. No.: 16/701,731

(22) Filed: Dec. 3, 2019

(65) Prior Publication Data
US 2020/0183790 A1 Jun. 11, 2020

(30) Foreign Application Priority Data
Dec. 11, 2018 (GB) .................................... 1820116

(51) Int. Cl.
| | |
|---|---|
| G06F 11/14 | (2006.01) |
| G05B 19/045 | (2006.01) |
| G06F 1/26 | (2006.01) |
| G06F 11/07 | (2006.01) |
| G06F 11/30 | (2006.01) |

(52) U.S. Cl.
CPC ........ G06F 11/1441 (2013.01); G05B 19/045 (2013.01); G06F 1/26 (2013.01); G06F 11/0739 (2013.01); G06F 11/0757 (2013.01); G06F 11/0793 (2013.01); G06F 11/3013 (2013.01); *G05B 2219/24125* (2013.01); *G05B 2219/25268* (2013.01); *G06F 2201/805* (2013.01)

(58) Field of Classification Search
CPC .. G06F 11/1441; G06F 1/26; G06F 2201/805; G06F 11/0757; G05B 19/045; G05B 2219/24125; G05B 2219/25268
See application file for complete search history.

(56) References Cited

U.S. PATENT DOCUMENTS

| | | | |
|---|---|---|---|
| 7,589,558 B1 * | 9/2009 | Tseng .................... | G06F 30/34 326/41 |
| 7,626,415 B1 | 12/2009 | Tseng et al. | |
| 10,614,005 B1 * | 4/2020 | Villano ................ | G05B 19/042 |
| 2011/0107158 A1 * | 5/2011 | Espinosa .............. | G06F 11/106 714/54 |

(Continued)

OTHER PUBLICATIONS

"Virtex (FPGA)", Mar. 11, 2017, Wikipedia—https://web.archive.org/web/20170311191248/https://en.wikipedia.org/wiki/Virtex_(FPGA) (Year: 2017).*

(Continued)

*Primary Examiner* — Bryce P Bonzo
*Assistant Examiner* — Michael Xu
(74) *Attorney, Agent, or Firm* — Oliff PLC

(57) ABSTRACT

A multi-logic device system, an electronic engine controller, and a method of operating the multi-logic device system. The multi-logic device system includes a primary logic device which is more resilient to single event effects, and one or more secondary logic devices, each secondary logic device being powered by a respective power supply unit and being more susceptible to single event effects. The primary logic device is configured to run, for each secondary logic device, a respective watchdog timer. Each watchdog timer is restarted upon receipt of a restart signal from the respective secondary logic device. The primary logic device is also configured, in response to a watchdog timer timing out, to identify and reset the secondary logic device corresponding to the timed out watchdog timer.

9 Claims, 2 Drawing Sheets

(56) References Cited

U.S. PATENT DOCUMENTS

2017/0308441 A1* 10/2017 Dickey .............. G06F 11/0757
2017/0357808 A1* 12/2017 Arroyo ................. G06F 21/57
2018/0293810 A1* 10/2018 Griffith ................ G07C 5/008
2019/0278660 A1*  9/2019 Swenson .......... H03K 19/00338
2020/0097683 A1*  3/2020 Weidele ................ G11C 11/005

OTHER PUBLICATIONS

Search Report of the Intellectual Property Office of the United Kingdom for GB1820116.0 with search date of May 29, 2019.
Czajkowski, D., McCartha, M., 'Ultra Low-Power Space Computer Leveraging Embedded SEU Mitigation', 2003 IEEE Aerospace Conference, 2003, vol. 5, pp. 2315-2328.
Nikicio, A. N., Loke, W-T., Kamdar, H., Goh, C-H., 'Radiation Analysis and Mitigation Framework for LEO Small Satellites', 2017 IEEE International Conference on Communication, Networks and Satellite (COMNESTSAT), 2017, IEEE, pp. 59-66.
Violante, M., Esposti, M.L., 'A low-cost solution for developing reliable Linux-based space computers for on-board data handling', 15th IEEE International On-Line Testing Symposium (IOLTS 2009), 2009, pp. 49-54.
May 4, 2020 Extended Search Report issued in European Patent Application No. 19208269.1.

* cited by examiner

SINGLE EVENT EFFECT MITIGATION

CROSS-REFERENCE TO RELATED APPLICATIONS

This specification is based upon and claims the benefit of priority from United Kingdom patent application number GB 1820116.0 filed on Dec. 11, 2018, the entire contents of which are incorporated herein by reference.

BACKGROUND

Field of the Disclosure

The present disclosure relates to a multi-logic device system, electronic engine controller, and method of operating the multi-logic device system.

Description of the Related Art

There is a desire to increase the use of higher performance commercial off-the-shelf processors in roles where, conventionally, bespoke processors have been used. This is driven by the increased computational demand being placed on processors operating with, for example, aircraft or gas turbine engines.

However commercial off-the-shelf processors generally have very small geometries, sometimes on the order of tens of nanometres. These smaller logic elements are more susceptible to single event effects i.e. effects due to radiation impinging the processor. For example, it has been known for processors to change state due to an ionizing particle striking a sensitive node in a processor. This is known as a single event upset or SEU. Whilst SEUs are easily remedied, e.g. via a software reset, an SEU can lead to a single event latch-up, or SEL. SELs are more serious, as they can require the power provided to the processor to be cycled to clear the fault. Such processors are generally assigned a lower design assurance level than processors which have been hardened to single event effects, or which have been proven to be impervious to SEU or SEL.

It is important then to identify and resolve single event effects quickly and effectively. This is especially true in the context of aircraft or gas turbine engine control, where safety critical systems may be monitored and/or controlled by commercial off-the-shelf processors.

SUMMARY OF THE DISCLOSURE

Accordingly, in a first aspect, the disclosure provides a multi-logic device system comprising:

a primary logic device, said primary logic device being more resilient to single event effects;

one or more secondary logic devices, each secondary logic device being powered by a respective power supply unit, said secondary logic devices being more susceptible to single event effects;

wherein the primary logic device is configured to run, for each secondary logic device, a respective watchdog timer, wherein each watchdog timer is restarted upon receipt of a restart signal from the respective secondary logic device; and wherein the primary logic device is configured, in response to a watchdog timer timing out, to identify and reset the secondary logic device corresponding to the timed out watchdog timer.

By locating the watchdog timer in a logic device, which is relatively resilient to radiation, faults due to single event effects in the secondary logic devices can be detected and mitigated more effectively.

The multi-logic device system may have any one or, to the extent that they are compatible, any combination of the following optional features.

The primary logic device may be a processor, or field programmable gate array (FPGA). The secondary logic devices may be processors or FPGAs. Where the primary logic device and secondary logic devices are processors, the system may be referred to a multi-processor system.

The single event effects may include single event latch-ups and a single event upsets.

Resetting the identified secondary logic device may include performing a power cycle of the respective power supply unit.

There may be a plurality of secondary logic devices, grouped by design assurance level, wherein secondary logic devices having the same design assurance level share a same power supply unit.

Each power supply unit may include a power supply short circuit protection unit added to an input of the logic rail conditioning of each secondary logic device. This can help ensure that a fault in one or more secondary logic devices does not affect the primary logic device as, when a latch-up occurs, the supply current to the secondary logic device can be limited and thus does not collapse the supply to the primary logic device.

Each secondary logic device may include logic elements with a size or no more than 70 nm.

The primary logic device may be hardened to single event effects. For example, the primary logic device may be encased in radiation shielding and/or be more tolerant to single event upset through design (e.g. further epitaxial layers).

In a second aspect, the disclosure provides an electronic engine controller, which includes the multi-logic device system of the first aspect. The multi-logic device system of the second aspect may have any one, or to the extent they are compatible, any combination of the optional features of the first aspect. The electronic engine controller may be an electronic engine controller of a gas turbine engine, typically an aero engine. Indeed, in a third aspect, the disclosure provides a gas turbine engine having the electronic engine controller of the second aspect.

In a fourth aspect, the disclosure provides a method of operating the multi-logic device system of the first aspect, the method comprising the steps of:

operating a respective watchdog timer, on the primary logic device, for each of the secondary logic devices, each watchdog timer being restarted upon receipt of a restart signal from the respective secondary logic device;

using the primary logic device to detect a time out event of a watchdog timer, and identify the secondary logic device corresponding to the timed out watchdog timer; and using the primary logic device to reset the secondary logic device corresponding to the timed out watchdog timer.

The multi-logic device system used in the method of the fourth aspect may have any one, or to the extent they are compatible, any combination of the optional features of the first aspect.

BRIEF DESCRIPTION OF THE DRAWINGS

Embodiments of the invention will now be described by way of example with reference to the accompanying drawings in which.

DETAILED DESCRIPTION OF THE DISCLOSURE

Aspects and embodiments of the present disclosure will now be discussed with reference to the corresponding drawings. Other aspects and embodiments will be apparent to those skilled in the art.

Figure 1:
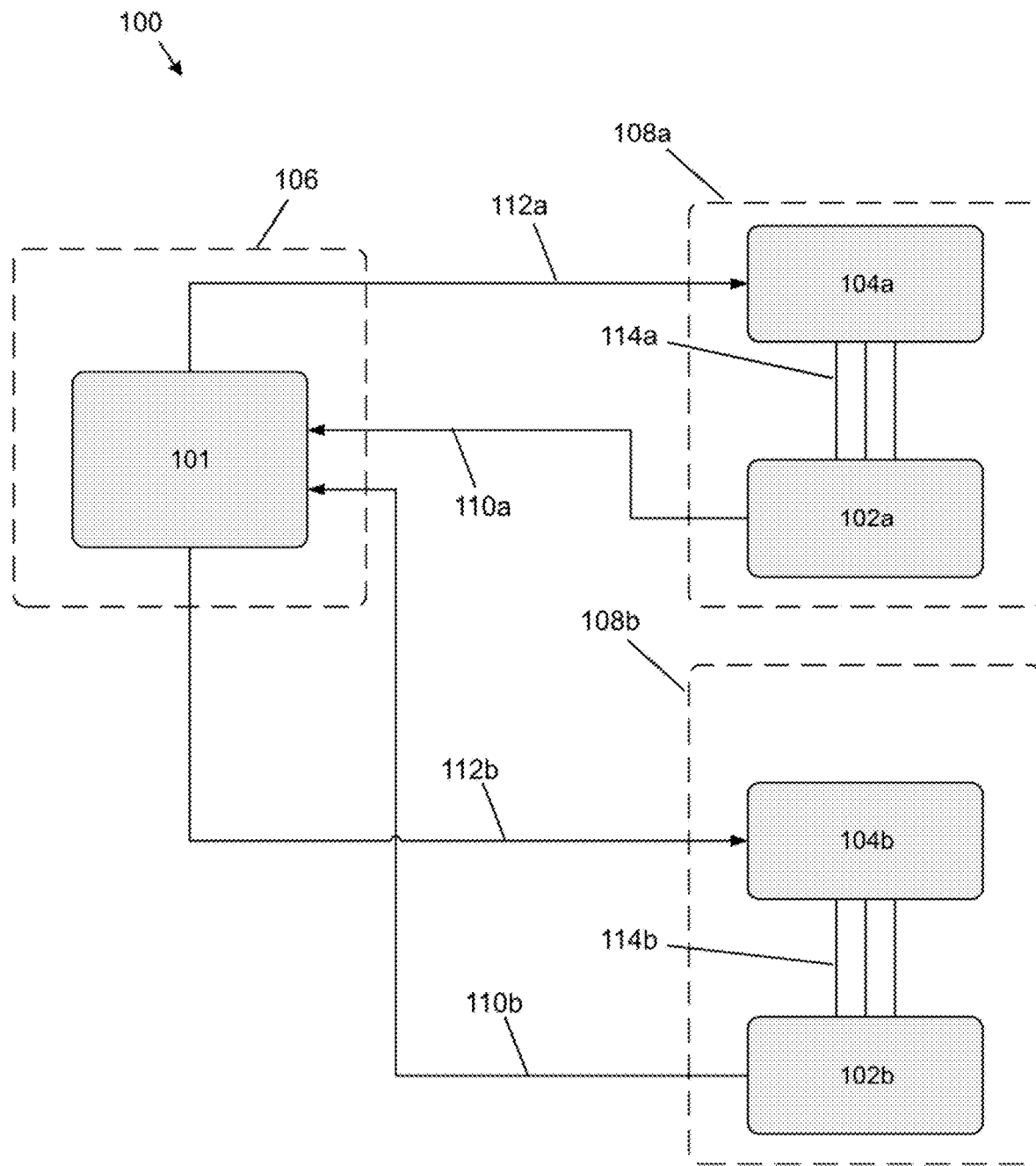
FIG. 1 shows a schematic of a multi-logic device system according to the present disclosure.

FIG. 1 shows a multi-logic device system 100, which includes multiple processors. A primary processor 101, is connected to two secondary processors: 102a and 102b. Each secondary processor has an associated power supply unit 104a and 104b, to which is it connected through respective logic rails 114a and 114b. In some examples, the power supply units 104a/104b may be power lines from a central power supply unit where each power line is protected by a short circuit protection device.

In use, the primary processor 101 operates a watchdog timer for each of the secondary processors. Therefore, in normal operation, each of the secondary processors sends a reset signal to the primary processor via respective connections 110a and 110b within a predetermined period. This reset signal resets the respective watchdog timer, and as a result the primary processor 101 can ascertain that the respective secondary processor is functioning normally.

In the event of a fault in one of the secondary processors 102a, 102b, for example a single even upset or single event latch-up, the secondary processor will not send the reset signal within the required time period. Once the time period has elapsed, the watchdog running in the primary processor 101 corresponding to the secondary processor times out. In response to this time out, the primary processor will instigate one or more corrective actions.

In this example, the primary processor 101 will send a power supply reset signal via connection 112a or 112b to the power supply unit 104a, 104b which powers the secondary processor which has encountered the fault. This reset signal may cause either or both of: a software reset, or a power cycle of the power supply unit.

Thereafter, the fault should be cleared from the secondary processor 102a, 102b, which can then recommence normal operations.

In this example, primary processor 101 is assigned to a design assurance group 106. This group 106 should be the highest design assurance level in the system, generally C or higher per DO-178C, Software Considerations in Airborne Systems and Equipment Certification, published by RTCA, Incorporated. Whereas, the secondary processors 102a and 102b are assigned, respectively, to design assurance groups 108a and 108b. These design assurance groups are not higher in assurance level than design assurance group 106. Each design assurance group may contain a plurality of secondary processors, all having the same design assurance level. In this example, design assurance group 108a has a design assurance level C, whereas design assurance group 108b has design assurance level E.

Figure 2:
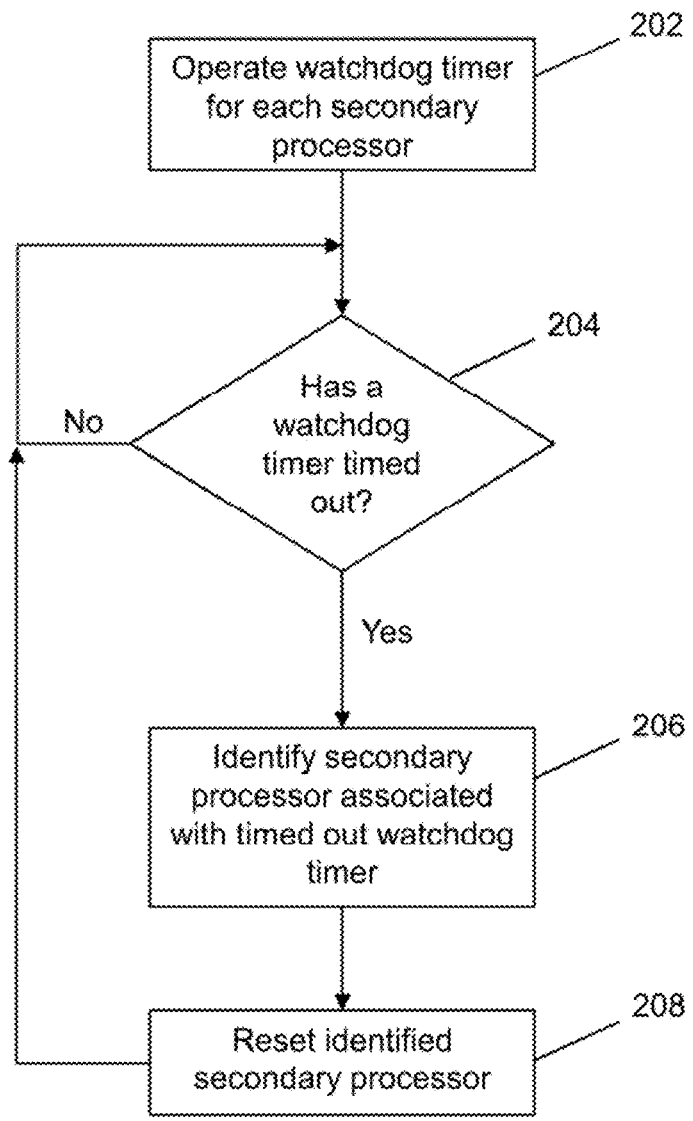
FIG. 2 shows a flow diagram of a method according to the present disclosure.

FIG. 2 shows a flow diagram illustrating a method of using the multi-processor system in FIG. 1. In a first step, 202, a watchdog timer is operated for each secondary processor. These watchdog timers are operated by the primary processor.

Next, in step 204, a check is made as to whether a watchdog timer has timed out. If no watchdog timer has timed out, the method returns to step 204 and a loop is created until one of the watchdog timers has timed out.

Once a time out has been detected, the method moves to step 206 wherein a secondary processor associated with the timed out watchdog timer is identified. Subsequently, in step 208, the identified secondary processor is reset and the method returns to step 204 and monitors for a timed out watch dog timer.

While the examples has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the spirit and scope of the disclosure.

I claim:

1. A multi-logic device system, comprising:
a primary logic device, said primary logic device being more resilient to single event effects; and
a plurality of secondary logic devices, grouped by design assurance level, each having power supply units, said secondary logic devices being more susceptible to single event effects;
wherein the primary logic device is configured to run, for each secondary logic device, a respective watchdog timer, wherein each watchdog timer is restarted upon receipt of a restart signal from the respective secondary logic device,
wherein the primary logic device is configured, in response to a watchdog timer timing out, to identify and reset the secondary logic device corresponding to the timed out watchdog timer,
wherein, of the plurality of secondary logic devices, secondary logic devices having a same design assurance level share a same power supply unit.

2. The multi-logic device system of claim 1, wherein the single event effects include single event latch-ups and single event upsets.

3. The multi-logic device system of claim 1, wherein resetting the identified secondary logic device includes performing a power cycle of the respective power supply unit.

4. The multi-logic device system of claim 1, wherein each power supply unit includes a power supply short circuit protection unit.

5. The multi-logic device system of claim 1, wherein each secondary logic device includes logic elements with a size of no more than 70 nm.

6. The multi-logic device system of claim 1, wherein the primary logic device is hardened to single event effects.

7. An electronic engine controller, including the multi-logic device system of claim 1.

8. A gas turbine engine, including the electronic engine controller of claim 7.

9. A method of operating the multi-logic device system of claim 1, the method comprising the steps of:
operating a respective watchdog timer, on the primary logic device, for each of a plurality of secondary logic devices, the plurality of secondary logic devices grouped by design assurance level, each watchdog timer being restarted upon receipt of a restart signal from the respective secondary logic device;
using the primary logic device to detect a time out event of a watchdog timer, and identify the secondary logic device corresponding to the timed out watchdog timer; and using the primary logic device to reset the secondary logic device corresponding to the timed out watchdog timer, wherein, of the plurality of secondary logic devices, secondary logic devices having a same design assurance level share a same power supply unit.

\* \* \* \* \*